(12) United States Patent
Claris

(10) Patent No.: US 10,105,639 B2
(45) Date of Patent: Oct. 23, 2018

(54) INERT GAS GENERATION SYSTEM, AND AN AIRCRAFT FUEL TANK INERTING SYSTEM IMPLEMENTING SAID INERT GAS GENERATION SYSTEM

(71) Applicant: Zodiac Aerotechnics, Roche la Moliere (FR)

(72) Inventor: Christophe Claris, Saint-Just-Saint-Rambert (FR)

(73) Assignee: Zodiac Aerotechnics (FR)

( * ) Notice: Subject to any disclaimer, the term of this patent is extended or adjusted under 35 U.S.C. 154(b) by 0 days.

(21) Appl. No.: 15/436,089

(22) Filed: Feb. 17, 2017

(65) Prior Publication Data

US 2017/0239615 A1    Aug. 24, 2017

(30) Foreign Application Priority Data

Feb. 18, 2016 (FR) ..................... 16 51294

(51) Int. Cl.
*B01D 53/22* (2006.01)
*B01D 71/02* (2006.01)
*B64D 37/02* (2006.01)
*B64D 37/32* (2006.01)

(52) U.S. Cl.
CPC ......... *B01D 53/226* (2013.01); *B01D 71/028* (2013.01); *B64D 37/02* (2013.01); *B64D 37/32* (2013.01); *B01D 2053/221* (2013.01)

(58) Field of Classification Search
CPC .. B64D 37/02; B64D 37/32; B01D 2053/221; B01D 53/226; B01D 71/028
See application file for complete search history.

(56) References Cited

U.S. PATENT DOCUMENTS

| 3,817,232 A | * | 6/1974 | Nakajima | F02M 25/00 123/539 |
| 4,681,602 A | | 7/1987 | Glenn et al. | |
| 4,894,068 A | * | 1/1990 | Rice | B01D 53/226 95/51 |
| 4,968,219 A | * | 11/1990 | Fisher-Votava | F04B 25/00 416/53 |
| 9,186,622 B1 | * | 11/2015 | Ranjan | B01D 53/228 |
| 2003/0005718 A1 | * | 1/2003 | Mitani | B64D 13/06 62/402 |
| 2005/0092177 A1 | * | 5/2005 | Bonchonsky | B01D 53/0454 95/138 |
| 2005/0115404 A1 | | 6/2005 | Leigh et al. | |
| 2005/0235659 A1 | * | 10/2005 | Brutscher | B64D 37/32 62/93 |
| 2005/0247197 A1 | * | 11/2005 | Snow, Jr. | A62C 3/06 95/138 |
| 2007/0004326 A1 | * | 1/2007 | Haas | B64D 13/06 454/71 |

(Continued)

FOREIGN PATENT DOCUMENTS

EP    1253077 A1    10/2002

*Primary Examiner* — Anthony R Shumate
(74) *Attorney, Agent, or Firm* — Forge IP, PLLC

(57) ABSTRACT

An inert gas generation system from a flow of air, notably for an inerting system for at least one aircraft fuel tank. The generation system includes an air circuit having an air inlet, an inert gas outlet, and a first and a second air separation module arranged in series on the air circuit to deplete oxygen within the air and to generate a nitrogen-enriched inert gas.

5 Claims, 2 Drawing Sheets

(56) References Cited

U.S. PATENT DOCUMENTS

| | | | |
|---|---|---|---|
| 2007/0267060 A1* | 11/2007 | Scherer | B64D 13/06 137/13 |
| 2008/0090510 A1* | 4/2008 | Scherer | B64D 13/06 454/71 |
| 2008/0168798 A1 | 7/2008 | Kotliar | |
| 2014/0353427 A1* | 12/2014 | Meckes | A62C 3/08 244/129.2 |
| 2016/0131431 A1* | 5/2016 | Army | B23P 15/26 165/167 |

* cited by examiner

INERT GAS GENERATION SYSTEM, AND AN AIRCRAFT FUEL TANK INERTING SYSTEM IMPLEMENTING SAID INERT GAS GENERATION SYSTEM

FIELD OF THE INVENTION

This invention relates to the art of inert gas generation systems, notably used in inerting systems for at least one fuel tank of an aircraft such as an airplane, a helicopter or similar.

BACKGROUND OF THE INVENTION

In the art of aeronautics, the use of inerting systems is well known for the generation of an inert gas, such as nitrogen or any other inert gas such as carbon dioxide, and for introducing said inert gas into fuel tanks for safety reasons in order to reduce the risk of explosion from said tanks.

A conventional, prior art inerting system typically includes an on board inert gas generation system (OBIGGS) supplied with air, for example with bleed air diverted from at least one engine. The bleed air diverted from at least one engine is currently the most widely used model. In such a system, the bleed air is typically routed from one or more engines at the opening known as the intermediate pressure port and/or the opening known as the high pressure port, depending on the flight situation. It should be noted that the use of bleed air for the air conditioning is advantageous because the bleed air has a relatively high pressure, as well as a relatively high temperature, such that the air can be adjusted to a wide range of desired pressure and temperature settings. The OBIGGS is connected to the airplane fuel tank and separates oxygen from the air.

An OBIGGS typically comprises an air separation module, or several modules arranged in parallel, containing for example zeolite membranes through which an air flow is forced. Due to the different mass transfer rates for nitrogen and oxygen, the system splits the air flow such that an air flow with high nitrogen content and an air flow with high oxygen content are obtained. The air fraction enriched with nitrogen, considered to be the inert gas, is routed into fuel tanks such that the mixture of air and kerosene vapor present at this location is displaced and discharged from the tanks. The air fraction enriched with oxygen may be reintroduced into the passenger cabin after having been treated using appropriate means and/or into the reactors' combustion chamber to improve combustion. The devices required for this process such as compressors, filters, and air or water cooling modules or similar are integrated into the inerting system.

When the ratio between fuel and oxygen in the empty part of the tank is below the ignition limit defined in accordance with the Federal Aviation Administration (FAA) requirements detailed in AC25.981-2A dated Sep. 19, 2008 and entitled "FUEL TANK FLAMMABILITY REDUCTION MEANS" and its appendices, no spontaneous ignition may occur. From the foregoing, inerting a fuel tank notably consists in injecting an inert gas in order to maintain the level of oxygen present within said tank below a certain threshold, for example 12%.

The inert gas generation systems known in the prior art comprise at least two air separation modules, which are arranged in parallel in order to generate and deliver a nitrogen-enriched gas with desired purity, in terms of residual oxygen concentration, and desired flow rate.

The inerting system preferably comprises a flow control valve installed downstream from the air separation modules, in order to modulate the type of flow sent to the tanks to suit the aircraft flight phase.

A low flow modulation rate, for example from 0.45 to 0.90 kg/min, allows for an inert gas of very high quality to be generated, notably comprising about 3% oxygen. This low flow mode is typically used during the stable phases of the aircraft, for example during the ground or cruising phases, which require relatively low inert gas flow rates.

In descent mode, the inerting system tends to use a high flow rate mode, for example from 0.68 to 1.36 kg/min, for which the flow rate of the inert gas sent to the tanks is high but the quality and purity levels are lower, notably of about 13% oxygen.

The main drawback of inert gas generation systems known in the prior art is their size. In fact, the arrangement of the air separation modules results in a generation system that is oversized, for example in terms of the number of modules and filtration components, in relation to the actual flight phase need, which in turn causes excessive consumption of kerosene and an increase in the weight of the aircraft.

SUMMARY OF THE INVENTION

One of the objects of the invention is therefore to remedy these drawbacks by proposing an inert gas generation system that allows for an inert gas of high quality, to be generated notably in terms of purity, and low oxygen content.

Another object of the invention is to provide an inert gas generation system that can be adjusted to the needs and flight phase of the aircraft.

To this end, and according to the invention, an inert gas generation system was developed from a flow of air, notably for an inerting system for at least one aircraft fuel tank, remarkable in that it comprises an air circuit comprising an air inlet, an inert gas outlet, and a first and a second air separation module arranged in series on said air circuit to deplete oxygen in the air and generate a nitrogen-enriched inert gas.

The air separation modules are arranged in series such that they allow for an inert gas of very high purity to be generated, i.e., with a very low oxygen content, notably of about 3%. In addition, smaller-sized separation modules may be developed in order to achieve performance similar to a system with larger separation modules and arranged in parallel. The integration of the inert gas generation system into the inerting system of an aircraft is therefore facilitated.

In a particularly advantageous embodiment of the invention, the air circuit comprises routing means for a portion of the air flow, upstream of the first module, directly to the second module, and routing means for the entire air flow, downstream from the first module, directly to the inert gas outlet.

It is therefore possible to change the arrangement of the air separation modules from series to parallel in order to suit the flight phase and actual inert gas quantity and quality requirements.

This invention allows the inert gas flow to be modulated in an alternative manner to the high flow/low flow modulation commonly used, by means of a method that uses air separation modules in series or in parallel.

Thus, this invention makes it possible to downsize the filtration equipment, such as the ozone converter and the particulate filter, and to use the air separation modules at a relatively constant flow rate which notably has advantages with respect to the thermal control of the system. The air preparation system of the inerting system may also be downsized.

Of particular interest for the invention are large inerting systems comprising more than two air separation modules.

In a particular embodiment, the generation system comprises a first valve and a second valve arranged on the air circuit between the first module and the second module, the first valve being connected to the gas outlet by a first bypass circuit, and the second valve being connected to the air circuit upstream of the first module by a second bypass circuit. The valves used may be flow control or pressure control valves.

The air separation modules may be of any type. The first and second air separation modules preferably comprise zeolite membranes with sizes that may differ from one module to another.

The invention also relates to an inerting system for at least one aircraft fuel tank. In a manner known in the prior art, the system comprises at least one inert gas generation system supplied with bleed air diverted from at least one engine and/or air from a passenger cabin and/or air from outside the aircraft via an air preparation system that uses a compressor, and distribution means for the inert gas to the fuel tank(s) connected to the inert gas generation system.

According to the invention, the inerting system is remarkable in that the inert gas generation system complies with the above characteristics.

Thus, when the aircraft tanks require a high inert gas flow rate, particularly during the descent phase of the aircraft, the invention allows the air separation modules to be changed to a series arrangement such that the inert gas is of a higher quality.

In contrast, when the tanks require a low inert gas flow rate, the inert gas with a low flow rate is already of high quality such that the air separation modules may be used in series or in parallel as needed.

BRIEF DESCRIPTION OF THE DRAWINGS

Further advantages and features will become clearer from the following description, given by way of a non-limiting example, of the inert gas generation system according to the invention, with reference to the accompanying drawings in which.

DETAILED DESCRIPTION OF THE INVENTION

Figure 1:
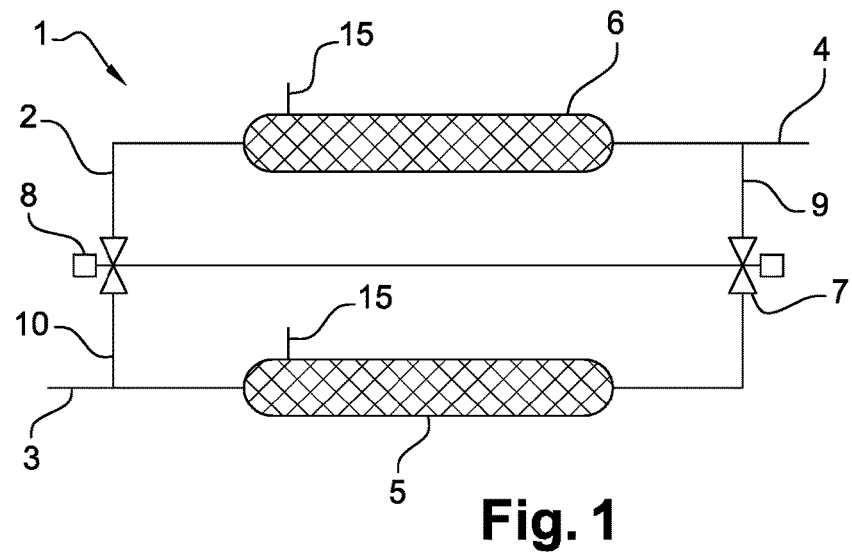
FIG. 1 is a schematic view of an inert gas generation system according to the invention.

In reference to FIG. 1, the invention relates to an inert gas generation system (1) comprising an air circuit (2) to deplete oxygen in order to generate a nitrogen-enriched inert gas.

Figure 2:
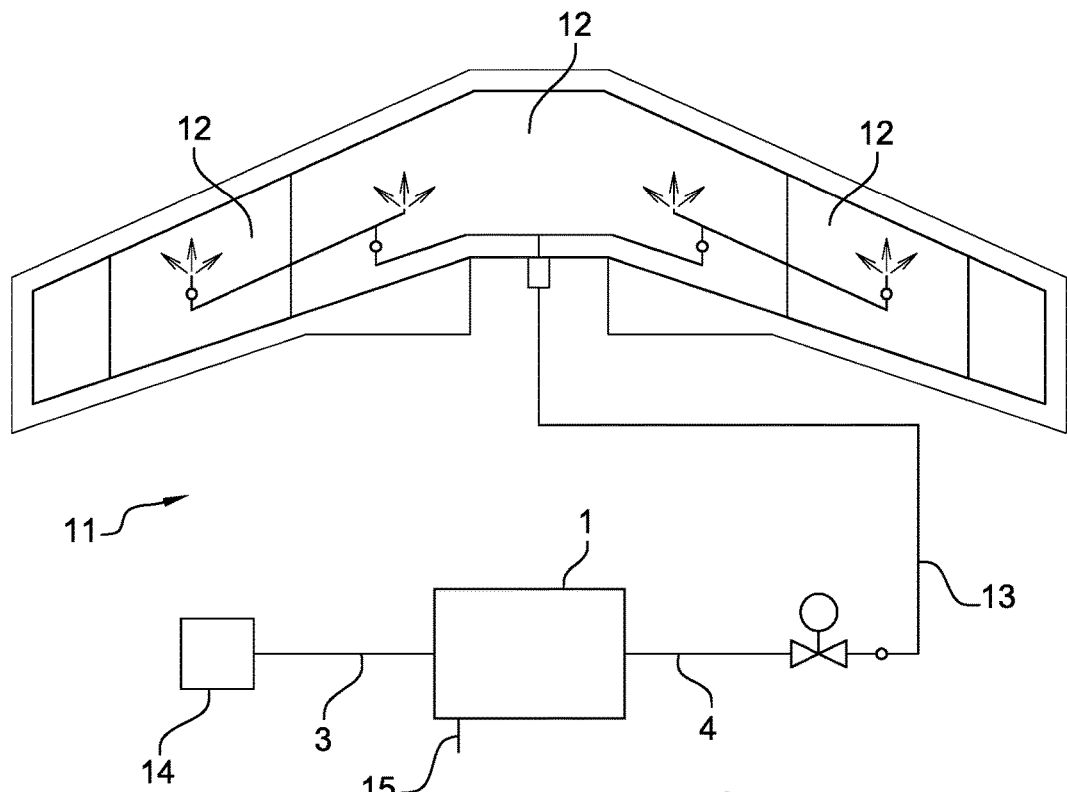
FIG. 2 is a schematic view showing an inerting system according to the invention.

In reference to FIG. 2, the generation system (1) is notably intended to be used in an inerting system (11) for at least one aircraft fuel tank (12). To this end, the inert gas generation system (1) comprises an air inlet (3) supplied with bleed air diverted from at least one engine and/or air from a passenger cabin and/or air from outside the aircraft via an air preparation system (14) that uses a compressor, and an inert gas outlet (4) connected to distribution means (13) for the inert gas to the fuel tank(s) (12). The generation system (1) also comprises an oxygen-enriched gas outlet (15).

The inerting system (11) allows an inert gas to be generated and introduced into said aircraft fuel tank(s) (12) for safety reasons in order to reduce the risk of explosion from said tanks. The injected inert gas aims to render the fuel tank(s) (12) inert, i.e., allows the level of oxygen present within said tank(s) to be reduced, and notably to maintain this level below a certain threshold, preferably less than 12%.

In reference to FIG. 1, the inert gas generation system (1) comprises at least two air separation modules (5, 6), comprising for example zeolite membranes through which the air is forced such as to obtain an inert gas with a high nitrogen content and an inert gas with a high oxygen content.

According to the invention, the air circuit (2) of the inert gas generation system (1) allows the two air separation modules (5, 6) to be connected together, and comprises arrangements for selectively routing, upstream of the first module (5), a portion of the air flow directly to the inlet of the second module (6), and arrangements for selectively routing, downstream from the first module (5), the entire air flow directly to the inert gas outlet (4).

To this end, the air circuit (2) comprises two valves (7, 8) arranged between the first and second air separation module (5, 6). A first valve (7) is connected directly to the gas outlet (4) via a first bypass circuit (9), and a second valve (8) is connected to the air circuit (2) upstream of the first air separation module (5) via a second bypass circuit (10).

The invention therefore allows the arrangement of the air separation modules (5, 6) to change from series to parallel.

When the aircraft fuel tanks require a high inert gas flow rate, notably during a non-stable phase of the aircraft such as the descent phase, the air separation modules (5, 6) are changed to a series arrangement by the actuation of the valves (7, 8) in order to obtain a high inert gas flow rate while ensuring that said inert gas is of a high quality and has a low oxygen content of about 3%.

Figure 3:
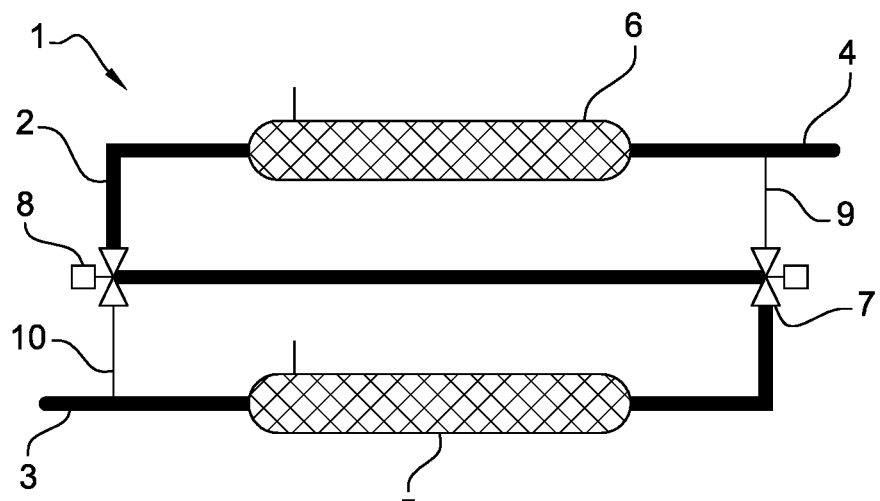
FIG. 3 is a schematic view similar to that of FIG. 1, showing the series arrangement of the air separation modules.

To this end, and in reference to FIG. 3, the valves (7, 8) are switched from a series control position wherein the air flow circulating within the air circuit (2) crosses the first air separation module (5), passes through the first and second valve (7, 8), crosses the second air separation module (6), and is discharged through the inert gas outlet (4) to be distributed and injected into the tanks.

The series arrangement of the air separation modules (5, 6) is also possible during the cruising phase of the aircraft in order to allow the sizing of the filtration components of the inert gas generation system (1) to be optimized.

Alternatively, when the tanks require a low inert gas flow rate and depending on the need or the flight phase, the air separation modules (5, 6) are changed to a parallel arrangement by the actuation of the two valves (7, 8).

Figure 4:
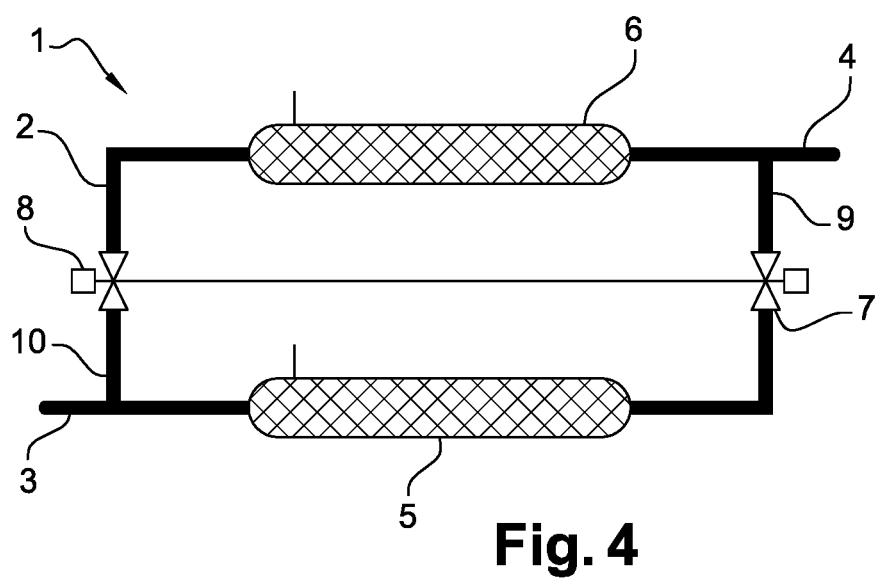
FIG. 4 is a schematic view similar to that of FIG. 1, showing the parallel arrangement of the air separation modules.

To this end, and in reference to FIG. 4, the valves (7, 8) are switched to a parallel control position therein from the air inlet (3):

a first portion of the air flow circulating in the air circuit (2) crosses the first air separation module (5) to the first valve (7) which then routes the first portion of the air flow in the first bypass circuit (9) and directly to the inert gas outlet (4) without passing through the second separation module (6);

a second portion of the air flow is routed by the second valve (8) in the second bypass circuit (10) and directly to the inlet of the second separation module (6), without passing through the first separation module (5), and crosses said second module (6) to the inert gas outlet (4).

According to the invention, inert gases with similar purities may be obtained with different flow rates depending on the arrangement in series or in parallel of the air separation modules (5, 6). This is particularly advantageous when the generation of an inert gas with constant quality and purity, and with different flow rates is required.

The invention is particularly advantageous when the valves (7, 8) used are pressure control or flow control valves.

Of course, without departing from the scope of the invention, other embodiments are possible with a generation system (1) comprising more than two air separation modules (5, 6) in order to generate an inert gas with a purity that meets the needs, notably for example in the context of closed loop control applications. The key aspects of the invention are the provision of an inert gas generation system (1) with air separation modules (5, 6) arranged in series, and the ability to advantageously change, as needed, said air separation modules (5, 6) to a parallel arrangement. Alternatively, with more than two air separation modules (5, 6), other possible arrangements are: an arrangement with air separation modules (5, 6) in series and in parallel, and an arrangement with air separation modules (5, 6) in series only. In addition, and to better adjust to the quantity and quality requirements of the inert gas, the size of the zeolite membranes of the first module (5) may differ from the size of those of the second module (6).

The inert gas generation system (1) according to the invention may also be used at the output (15) of a generation system (1) for extracting the residual nitrogen in said oxygen-enriched gas and improving the yield of said system.

Similarly, since an inert gas generation system (1) also generates an oxygen-enriched gas, the invention may be used to generate an oxygen-enriched gas with air separation modules selectively arranged in series or in parallel.

What is claimed is:

1. An inert gas generation system from a flow of air, for an inerting system for at least one aircraft fuel tank, said generation system comprising an air circuit comprising an air inlet, an inert gas outlet, and a first and a second air separation module arranged in series on said air circuit to deplete oxygen within the air and to generate a nitrogen-enriched inert gas, characterized in that the air circuit comprises a first valve for selectively routing, upstream of the first module, a portion of the air flow directly to an inlet of the second module, and a second valve for selectively routing, downstream from the first module, the entire air flow directly to the inert gas outlet.

2. The generation system according to claim 1, characterized in that the first valve and the second valve are arranged on the air circuit between the first module and the second module, the first valve being connected to the gas outlet by a first bypass circuit, and the second valve being connected to the air circuit upstream of the first module by a second bypass circuit.

3. The generation system according to claim 2, characterized in that the first valve and the second valve are flow control valves.

4. The generation system according to claim 2, characterized in that the first valve and the second valve are pressure control valves.

5. An inert gas generation system from a flow of air, for an inerting system for at least one aircraft fuel tank, said generation system comprising an air circuit comprising an air inlet, an inert gas outlet, and a first and a second air separation module arranged in series on said air circuit to deplete oxygen within the air and to generate a nitrogen-enriched inert gas, characterized in that the first and second air separation module comprise zeolite membranes, and further characterized in that the size of the zeolite membranes of the first module is different from the size of the zeolite membranes of the second module.

* * * * *